United States Patent [19]
Gaer

[11] Patent Number: 5,231,609
[45] Date of Patent: Jul. 27, 1993

[54] MULTIPLATFORM SONAR SYSTEM AND METHOD FOR UNDERWATER SURVEILLANCE

[75] Inventor: Marvin C. Gaer, Cherry Hill, N.J.

[73] Assignee: The United States of America as represented by the Secretary of the Navy, Washington, D.C.

[21] Appl. No.: 952,380

[22] Filed: Sep. 28, 1992

[51] Int. Cl.$^5$ ............................................. G01S 15/00
[52] U.S. Cl. ..................... 367/99; 367/118; 367/136; 367/117
[58] Field of Search .................. 367/99, 118, 136, 117

[56] References Cited
U.S. PATENT DOCUMENTS
4,924,448  5/1990  Gaer ..................... 367/88

Primary Examiner—Daniel T. Pihulic
Attorney, Agent, or Firm—James V. Tura; James B. Bechtel; Susan E. Verona

[57] ABSTRACT

A system and method of indirect underwater acoustic ocean surveillance is disclosed requiring at least two sonar platforms, usually ships, travelling some distance apart. At least one of the platforms transmits sonar pulses, portions of which are scattered off the ocean floor to at least one companion sonar receiver platform. The receiver platform is provided with means to analyze the received scattered sonic pulses to determine if a submerged object such as a submarine is obstructing a portion of the pulse, thus casting an acoustic shadow. With accurate positioning information supplied by a navigation information system such as the NAVSTAR GLOBAL POSITIONING SYSTEM (GPS), and by combining pulse measurements over several positions the system will be able to locate, identify, and track the obstructing object by analyzing these acoustic shadows or silhouettes. Geometric silhouette reconstruction techniques and other mathematical techniques may be employed to construct an image of the submerged object.

17 Claims, 14 Drawing Sheets

MULTIPLATFORM SONAR SYSTEM AND METHOD FOR UNDERWATER SURVEILLANCE

STATEMENT OF GOVERNMENT INTEREST

This invention described herein may be manufactured and used by or for the Government of the United States of America for governmental purposes without the payment of any royalties thereon or therefor.

BACKGROUND OF THE INVENTION

This invention is concerned with detecting, locating, identifying, and tracking submerged objects, particularly submarines, through the transmission and reception of sonar pulses called "pings". Underwater acoustic surveillance systems and methods that now carry out these tasks are usually divided into two categories designated as "active" and "passive", although some mixed systems are also employed. Active underwater surveillance involves transmitting sonar signals, pings, then intercepting and analyzing the reflected or scattered echoes from the objects these signals may encounter. The analyzed signals may yield information determining the presence, location, identity, and track of these underwater objects.

Active underwater sonar surveillance systems are usually monostatic, i.e., the same platform is used for transmitting and intercepting these signals. A disadvantage to using an active system is that a targeted object may be able to trace the signal back to the transmitter platform. Should the target be hostile, such as an enemy submarine, it may be able to use this information to interdict the transmitter platform or to take evasive action. Submarines have also adopted, as stealth countermeasures, hull designs and construction materials that absorb or diffuse sonar signals making these reflected echoes difficult to detect and analyze.

In passive acoustic underwater surveillance, listening platforms employ hydrophones to monitor the underwater sounds present in the ocean environment. Recognition of characteristic sounds, called "acoustic signatures", of various vessels lead to their detection and identification. Submarines, however, have become quieter and are developing increasingly more effective stealth techniques enabling them to more successfully evade detection by passive systems. Also, a submerged object which is emitting no sound, such as a stationary submarine, would be undetectable to a purely passive system.

SUMMARY OF THE INVENTION

This invention can be utilized on any large, relatively deep expanse of water including an ocean, sea, lake or river. The word "ocean" is used to represent any of these for the purpose of the disclosure.

This invention discloses a system and method to perform underwater acoustic surveillance requiring at least two sonar platforms. At least one of the platforms transmits sonar pulses which are scattered off the ocean floor in random directions, and at least one of the other platforms is equipped with a sonar receiver hydrophone array to intercept a portion of these scattered pulses. These platforms, although perhaps several miles apart, would be in virtually continuous communication with each other concerning their absolute geographical positions and their relative positions with respect to each other. These position fixes are to be provided by a highly accurate navigation information system such as the NAVSTAR Global Positioning System (GPS) or by direct measurements. Phased arrays of sonar ping projectors and hydrophones determine the patterns of the sonic pulse transmissions and receptions through acoustic beamforming. A related invention, Gaer, U.S. Pat. No. 4,924,448, May 20, 1990, teaches a bistatic or two platform system and method for bathymetry using separate platforms, usually two survey ships, for transmitting and receiving sonar pulses scattered off the ocean floor to map ocean depths. In this bistatic system, GPS may be used for position fixing.

As in the cited patent, the receiving platforms here are able to determine the angle of reception of portions of a pulse as it is scattered off a spot on the ocean floor. Knowing the absolute positions or relative positions of the transmitters and receivers, the angle of interception and the time of travel of each of these received portions of the scattered pulse leads to the determination of the depth of the scattering spot at that angle. The collection of the scattering spots for a single ping provides, on analysis, an acoustic "snapshot" of the insonified region of the ocean floor synthesized from the angular distribution and depths of these spots. Should a submerged acoustically opaque object, such as a submarine, or other target, be located in this acoustic field blocking portions of the signals from the transmitters to the receivers, then it would appear as a fuzzy acoustic "shadow" of decreased sonic energy in this "snapshot". It is the sensing, measurement, interpretation, and analysis of these fuzzy acoustic shadows, taking into account diffraction and refraction effects, which enables this system to locate, identify, and track these submerged objects. It is assumed throughout this specification that the targeted object is not resting on the ocean floor. For submarines in deep ocean regions, this is almost always the case.

The usual or preferred mode of operation of this system would require planning the surveillance search scheme to make it more likely that the target object would block the acoustic wavefronts after they are scattered off the ocean floor. Since the signals would then be randomly scattered before impinging on the target object, the transmitter would not be directly traceable by the target such as a submarine. The geometrical analysis of the acoustic shadows would also be expected to be simpler in this case.

In this system the surveillance platforms could consist of any combination of ships or other sea-going vessels with hull mounted sonar transmitters and hydrophones, or similarly equipped submarines, towed arrays of sonar transmitters and hydrophones, including those towed by helicopters or other aircraft, sonobuoys in communication with sea-going vessels or aircraft, autonomous underwater vehicles (AUV's) and remotely operated underwater vehicles (ROV's). Some of these platforms may be exclusively transmitting platforms or receiver platforms and some may perform both functions. It is also possible that the analysis of the data as well as the course and surveillance management of the platforms could be performed at remote data processing facilities, perhaps on shore, via radio and satellite linkages. Remote processing might prove to be particularly advantageous because of the heavy computational requirements of the system.

By using several platforms at different angular displacements and analyzing the scattered echoes of several pings, a sufficient number of acoustic shadow projections of the object can be obtained to make it possible to mathematically construct an image of the object or guess its identity with high probability from a finite list of possibilities.

In the sensing and analysis of these acoustic shadows, the primary interest is in estimating the target's extreme dimensions. Even if insufficient projections are obtained to construct an image analytically, it would still be possible to estimate the identity of the object from a finite list of possible candidates, with a reasonable probability of being correct, by statistically matching dimensions.

Thus, a principal feature of this invention is to provide a multiplatform system and method for performing underwater acoustic surveillance to detect, locate, identify, and track submerged objects particularly submarines.

Another feature of this invention is to provide a means for identifying submerged objects by measuring and analyzing the shapes and dimensions of projections of the acoustic shadows of the objects.

A further feature of this invention is to use indirect randomly scattered sonic pulses to insonify submerged objects while not revealing the exact location of the pulse transmitters to the targeted object.

These and other features and applications of the invention will be evident to those skilled in the art.

BRIEF DESCRIPTION OF THE DRAWINGS

Embodiments of the invention are described by way of examples with reference to the accompanying drawings in which.

DETAILED DESCRIPTION

In this description, we assume that the submerged target object is a submarine which is not resting on the ocean floor. Objects resting on the ocean floor would require different detection schemes than those disclosed here.

Figure 1:
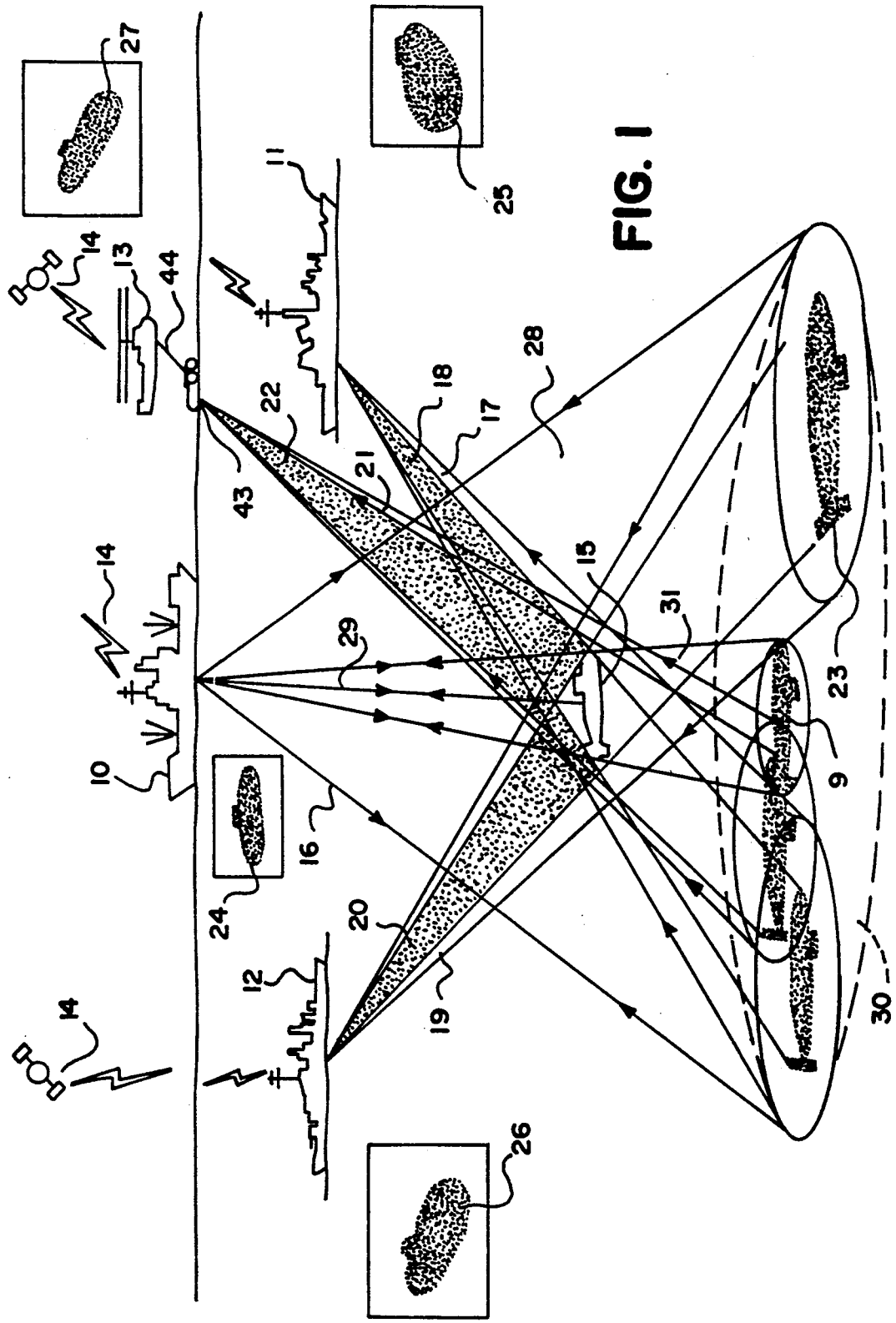
FIG. 1 illustrates a multistatic underwater surveillance system involving several acoustic platforms and a submarine target.

FIG. 1 illustrates a conceptual version of the system. In FIG. 1, four representative platforms are shown to be participating in an underwater surveillance activity. These platforms are in continuous communication with each other, are under a central controller, and determine their absolute and relative position coordinates via the satellite GPS system 14 or some other accurate navigation information system. Referring to FIG. 1, the transmitter ship 10, transmits sonic pulses, sonar rays, 16 towards the ocean floor, in a predetermined beam-formed pattern. In the preferred mode of operation, the sonic pulses insonify a portion of the ocean floor 30 and are randomly scattered in all directions due to its irregular or rough texture. Some of the beams are forward scattered in sonic beam cones 17, 19, and 21 to the receiving hydrophone platforms 11, 12, and 13, respectively, where 11, and 12 are ships and 13 is a helicopter towing a hydrophone array 43 with a tow cable 44. Some beams form a backscattered cone 28 directed towards the transmitting ship 10 which may also be equipped with receiver hydrophones. For simplicity the beam paths are shown as straight lines and the volumes bounded by these lines are shown and referred to as "cones", but in reality refraction effects would produce curved paths bounding quasi-conical volumes. In the analysis, this curvature would have to be corrected for using local sound velocity profile tables or equations.

If the target object 15, a submarine here, is present in the beam paths, it blocks a portion of the energy in the sonic beam cone either before or after these beams reach the ocean floor forming the "sonic shadows" 18, 20, and 22 within the sonic cones 17, 19, and 21, respectively. These sonic shadows would project down in their respective cones from the receiver platforms as zones of decreased sonic energy or acoustic silhouettes 23 on the ocean floor. By "silhouette" as used here, it is almost always meant the filled in shadow projection representation of the acoustic shadow rather than its outline. The receiving platforms 11, 12, and 13 may mathematically produce pictorial computer representations of these sonic silhouettes 25, 26, and 27, respectively. These sonic silhouettes appear differently to each of the receiving platforms depending on the orientation and distance of the silhouettes from the target. In contrast the transmitting platform 10 receives the back-scattered reflected sonic cone 29 in the transmitted sonic cone 28. This reflected cone would also project down as the image 9 on the ocean floor. The platform 10 may produce the pictorial computer representation 24 of this image.

In reality the computed silhouette outlines would be fuzzy somewhat unfocused and distorted due to the effects of diffraction and refraction, but resolution and focus would be sharpened when the results of several pings are combined and averaged. Under ordinary circumstances, determining the location of the object would require at least two observations from different directions. One receiver platform would determine the direction of the silhouette in the scattered beam cone, but would not be able to estimate the distance of the target object from the receivers. However, two receiver platforms would determine two beam cones containing silhouettes of the object. The intersection of these two cones would contain the target object and lead to an estimate of the target's position and distance from the hydrophone receivers. As the results of more and more pings are combined, these estimates would improve. Once this position is known, estimates of the target's size and shape would be obtainable as described below.

For simplicity only ship 10 is considered a transmitting platform in this description. However, there may be multiple transmitting and receiver platforms in a group.

Figure 2:
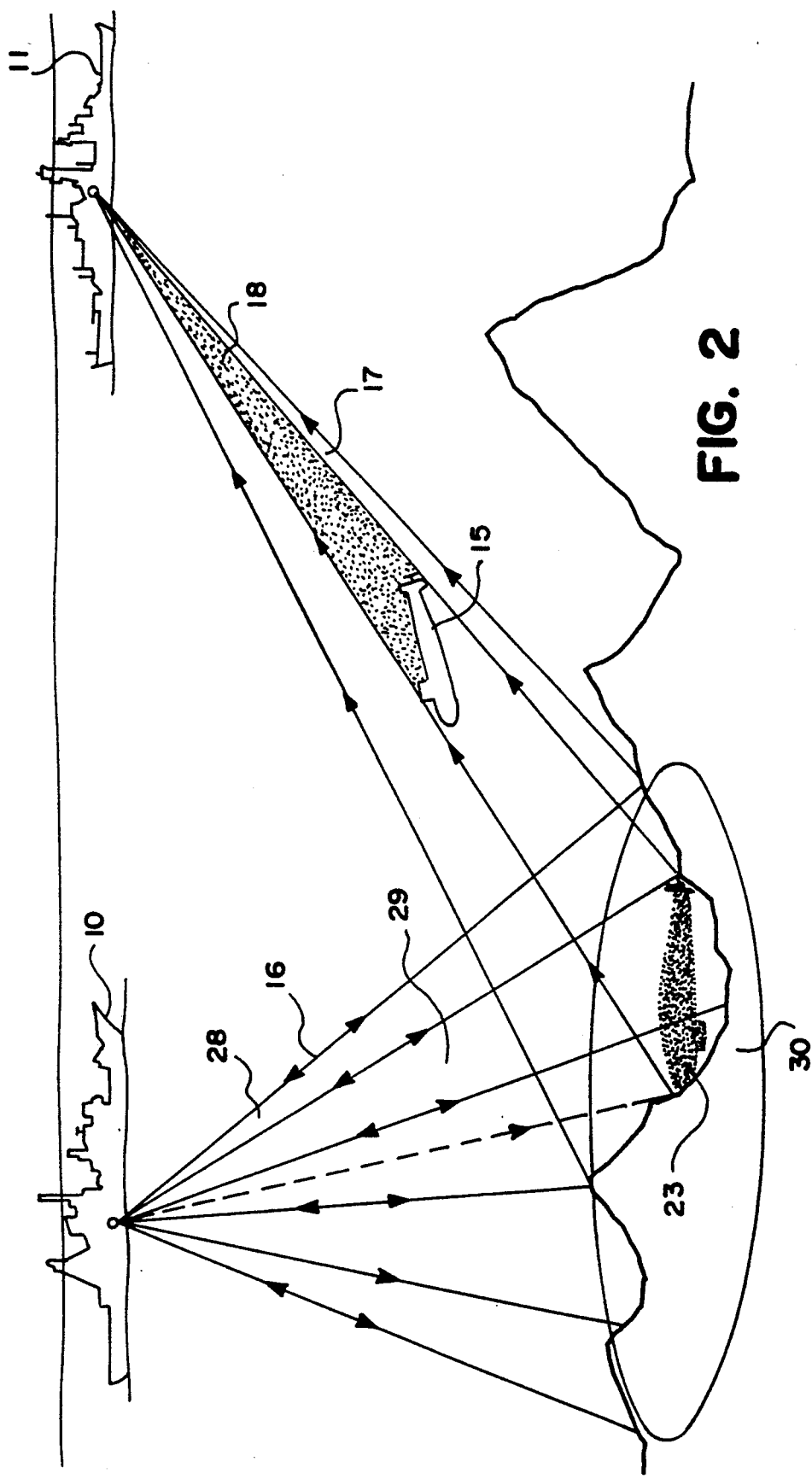
FIG. 2 is a diagrammatic perspective view of one possible configuration of a transmitting ship, a receiving ship, and a target submarine in the scattered sonar cone.
Figure 3:
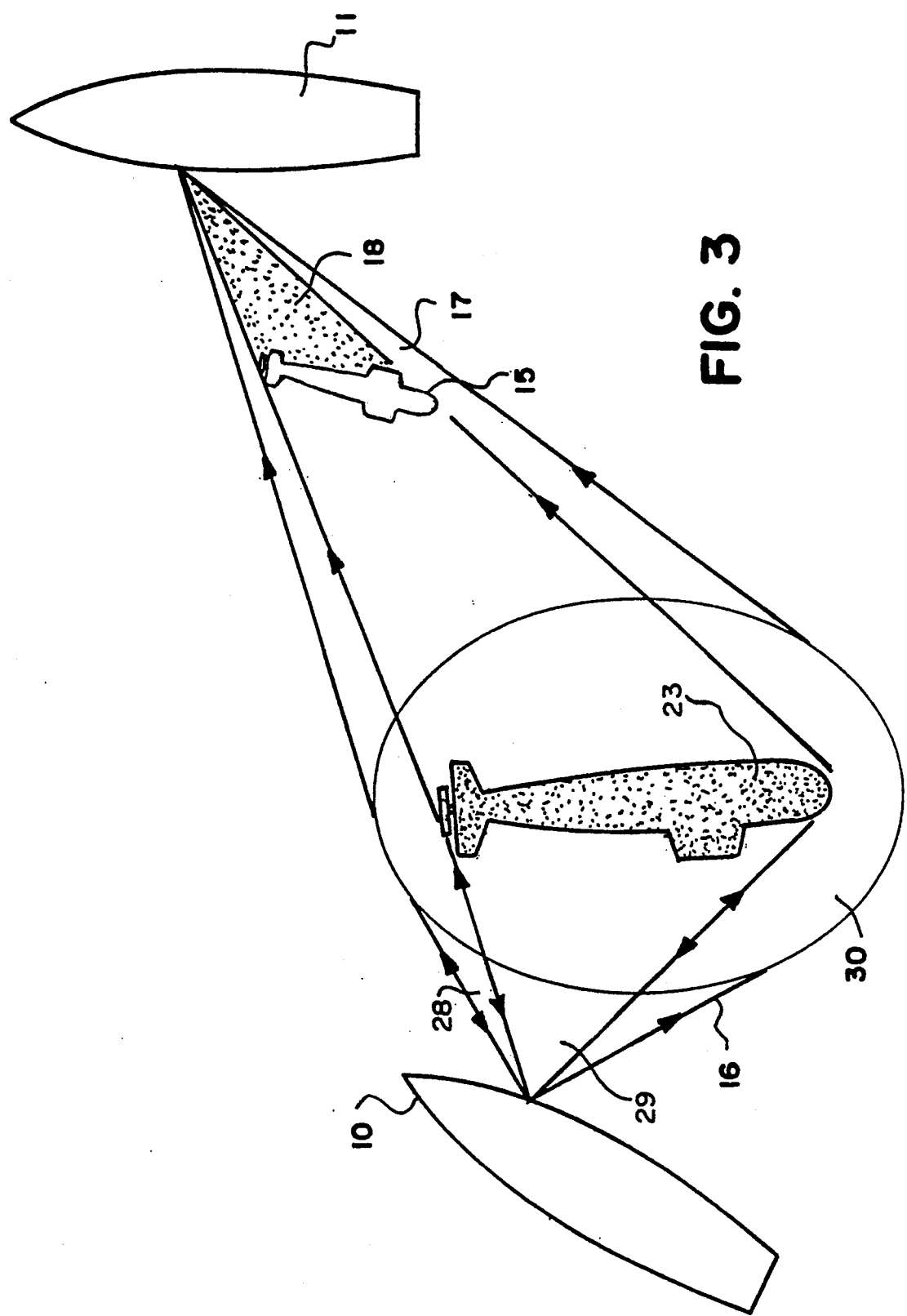
FIG. 3 is a top view of the configuration in FIG. 2.

Referring now to FIGS. 2 and 3, two views of a possible configuration of a transmitting ship 10 and receiving ship 11 are shown with a submarine 15 in the forward scattered sonic cone 17. FIG. 2 is a cutaway perspective side view of this configuration and FIG. 3 is a top view. In this configuration the sonar rays 16 from the transmitting ship 10 project the sonic cone 28 which insonifies region 30 of the ocean floor. A portion of this beam is forward scattered as a sonic cone 17 to the receiving ship 11. The target submarine 15 located in this portion of the forward scattered beam creates a "sonic shadow" 18 which is sensed by the receiving ship 11 as a decrease in sonic energy in the direction of the target submarine 15. This "sonic shadow" 18 projects down as the "sonic silhouette" 23. Note that the transmitting ship 10 still receives backscattered portions 29 of the sonic cone 28 from the silhouette 23 as though no target was present. Although, portions of the downward projected cone 28 might impinge directly on the target submarine, 15, proper beamforming would reduce the impinging energy to close to the random noise background level making the ping difficult to detect by the target 15.

As stated above, at least two receiver images from different positions are necessary to estimate the position of the target submarine 15 and thus its distance from the receiver platform. With the position of the target determined, estimates of the target's dimensions, identity, and track can be statistically determined by analyzing the target's sonic silhouettes from several directions over several pings.

Figure 4:
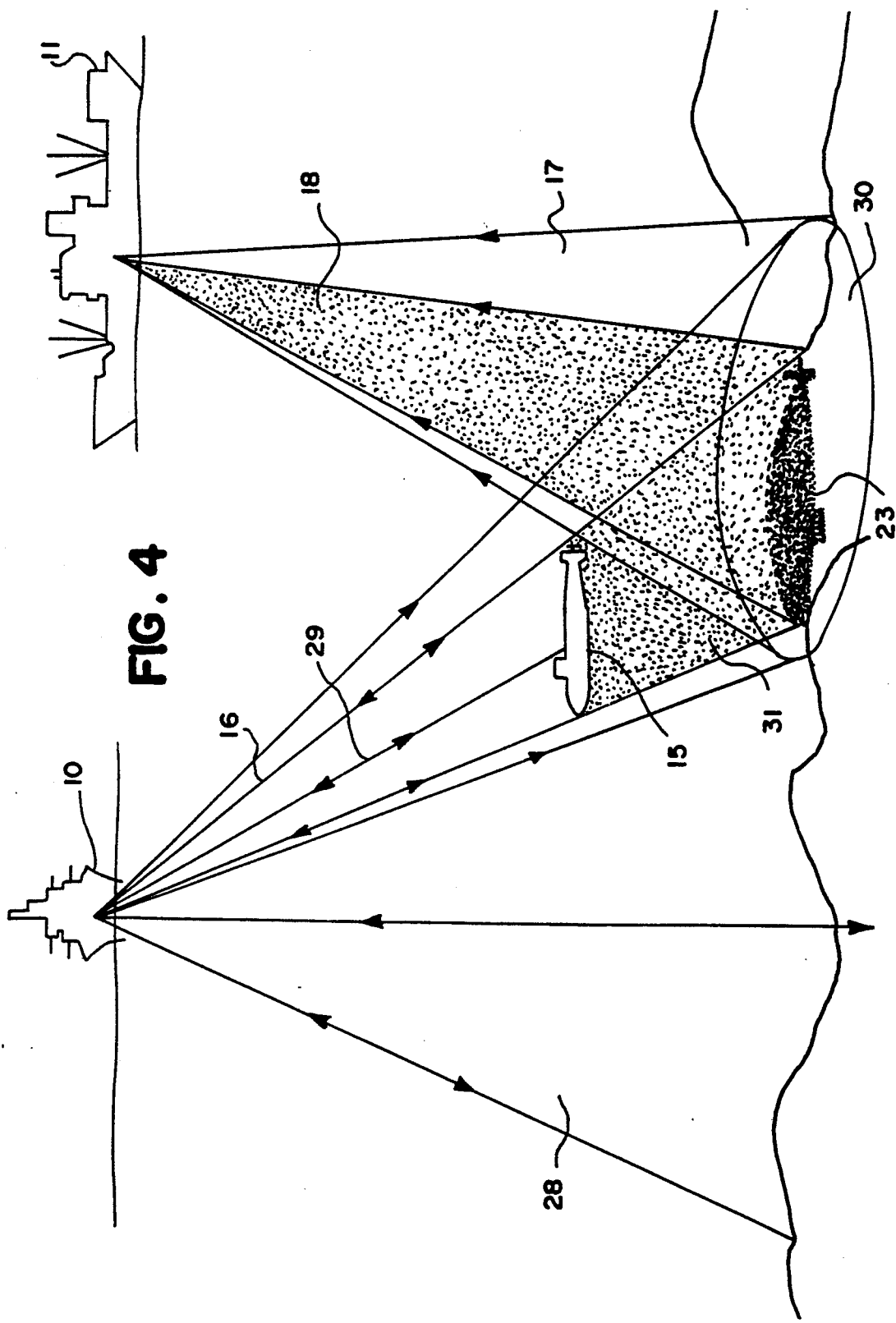
FIG. 4 is a diagrammatic perspective view of another possible configuration of a transmitting ship, a receiving ship, and a target submarine in the transmitted sonar cone.
Figure 5:
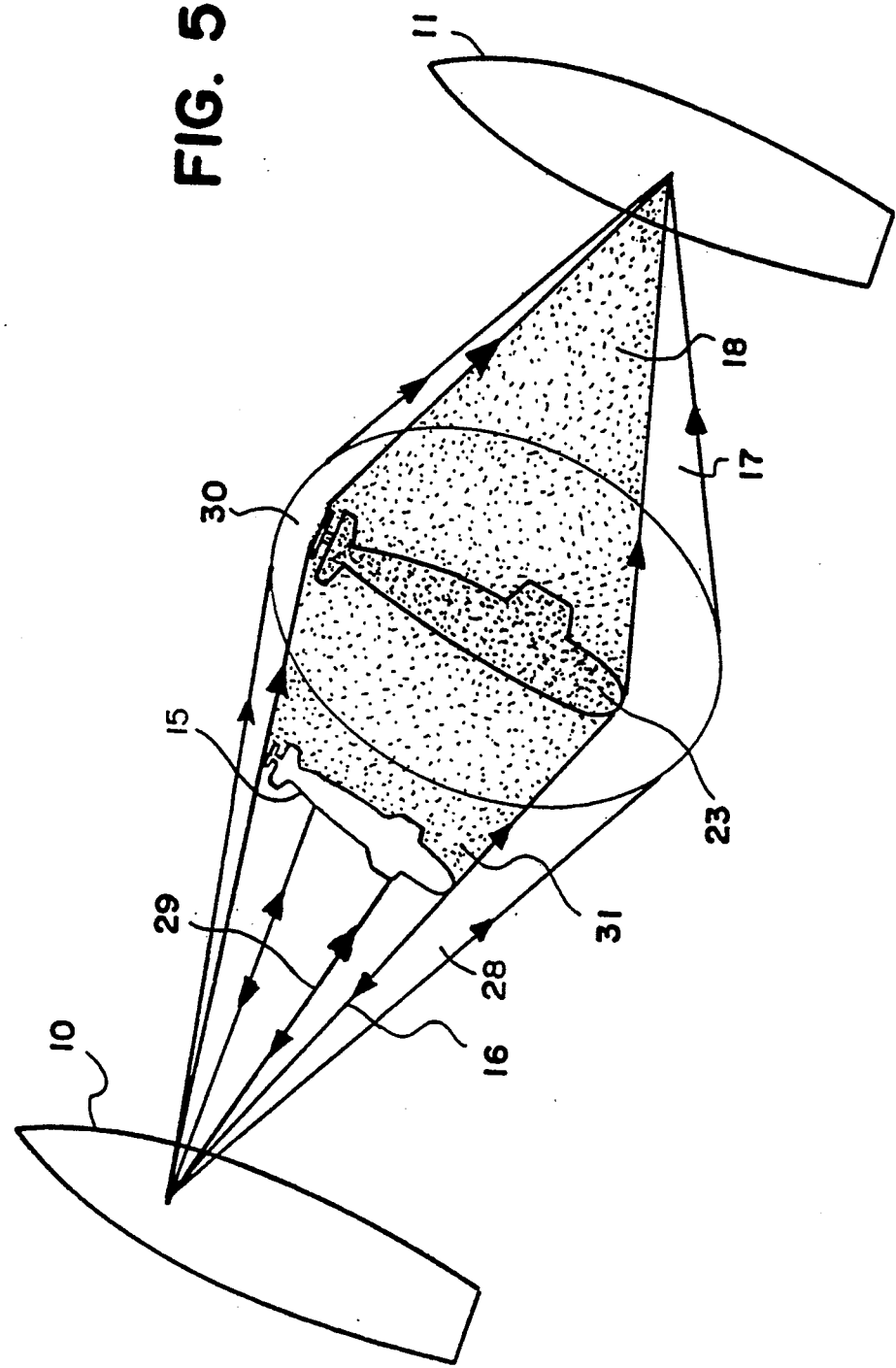
FIG. 5 is a top view of the configuration in FIG. 4.

In FIGS. 4 and 5, another possible configuration of the transmitter ship 10, the receiver ship 11, and the target submarine 15 is presented in a perspective side view and top view, respectively. Here a submarine 15 is found in the downward directed sonic cone 28 formed in the transmitted rays 16 before scattering off the ocean floor to the receiver ship 11. In this case, a portion 29 of the transmitted pulse is reflected back from the target submarine 15 towards the transmitter ship 10. Simultaneously the target 15 creates a sonic silhouette 23 in the insonified region 30 by blocking out the pulse in the sonic shadow cone 31. This shadow 31 produces a conical like region of decreased sonic energy 18 in the forward scattered sonic cone 17 which is received by the receiver ship 11. The receiver ship would interpret this cone of decreased sonic energy as the sonic silhouette 23 projected onto the ocean floor.

As before, estimates of the position of the target would require the intersection of at least two sonic cones containing the target submarine 15. Here by sonic cone, we include the more general volume of the "broken" cone indicated in FIGS. 4 and 5, which includes the portions from the ocean floor to the target and to the receiver platform, refer to the description of FIG. 9 below. Using position estimates, the dimensions, identity, and track of the target submarine can be statistically determined by analyzing these sonic silhouettes from several directions over several pings. The configuration represented by FIGS. 4 and 5 is likely to lead to a more complicated analysis than that of FIGS. 2 and 3 because of the less symmetric relation of the platforms and target and the greater complexity of the sonic shadow cones.

Figure 6:
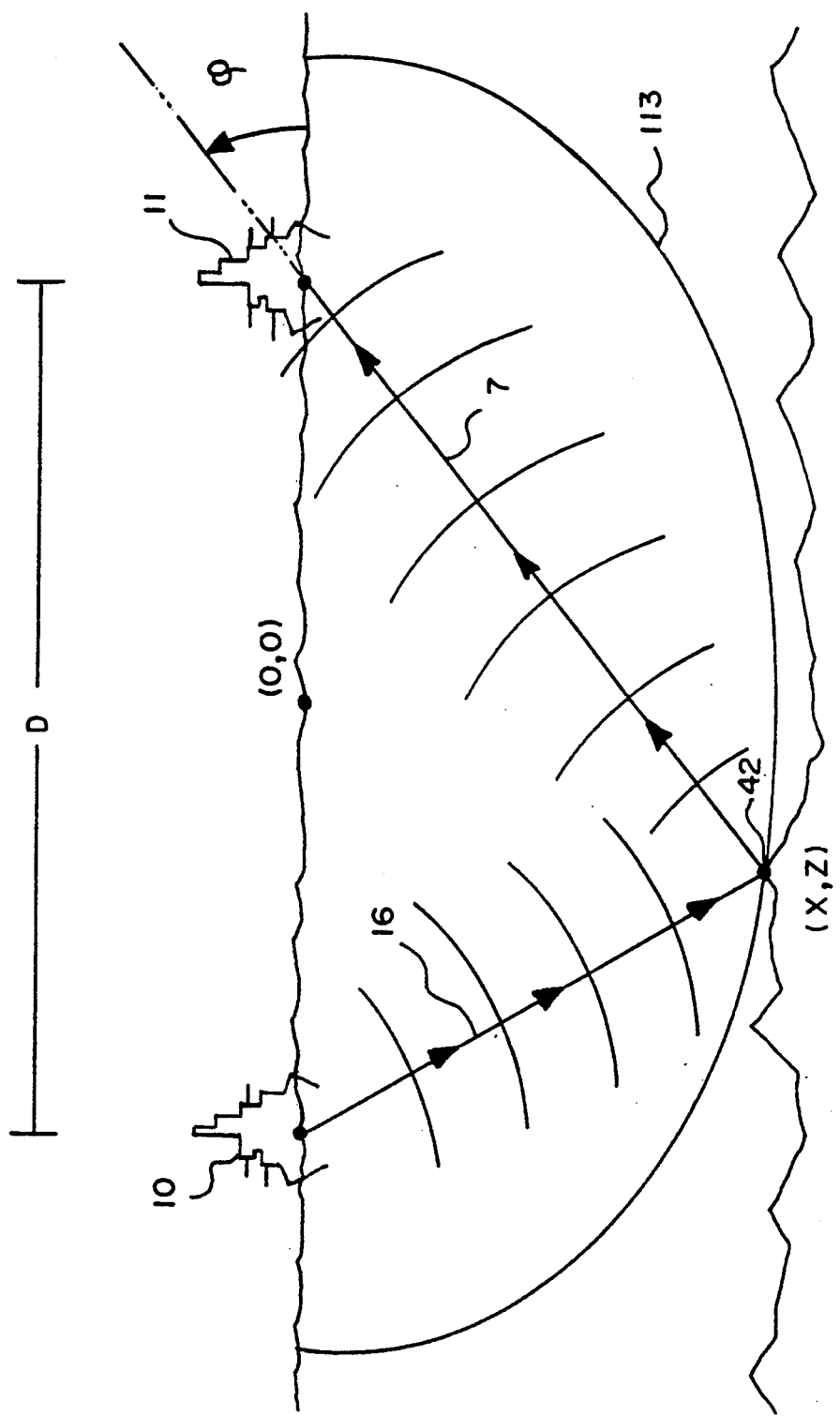
FIG. 6 is a diagram of the geometrical relations for the depth analysis.

FIG. 6 presents a simplified geometrical two dimensional projection of the forward scattered beam depth measurements in the unobstructed case. Let $T_P$ be the time of the ping transmission by the ship 10 and $T_R$ be the time of ping reception by ship 11, the ships being a distance D apart at their midlines. Now, assuming the speed of sound, c, in water is constant, the distance that the sound can travel in the time interval $\Delta T = T_R - T_P$ is $S = c\Delta T$. Thus, the locus of all points which could be candidates for a bottom scattering point for this time interval $\Delta T$ must require a sound path of total distance S in the ocean between the origin of the ping at the projectors of ship 10 and its reception at the hydrophones of ship 11. The locus of such a set of points will be an ellipse 113, under these simplifying assumptions, with the two ships at the foci. Let the origin (O,O) of the coordinate system be chosen as the midpoint of the line between the survey ships. Now if ship 11 notes that at time $T_R$ it received the signal transmitted at time $T_P$ making an angle $\phi$ with the horizontal, then a line 7 drawn through the center of the hydrophone making an angle $\phi$ with the horizontal between the two ships, will intersect this ellipse in one and only one point (X,Z), 42, at the point where the transmission ray 16 meets the ocean bottom. This is the point on the ocean bottom from which the signal was scattered. Here X is the horizontal coordinate of the point and Z is its depth. The equation for this ellipse, 113, is given as:

$$X^2(S^2 - D^2) + Z^2 S^2 = S^2(S^2 - D^2)/4$$

and the equation of the line, 7, is given as:

$$Z = (X - D/2)\tan\phi$$

These equations can now be solved for X and Z to provide the contour level point. Thus, for a particular pulse, the swath depths form the collection of points {(X,Z)} determined from the time intervals and angles of arrival of the measured echo receptions.

In reality, the speed of sound in water will vary as a function, of temperature, density, salinity, and other factors. Therefore, the curve 113 will not be a perfect ellipse nor will the rays 7 and 16 be perfect straight lines. However, empirical data can be used to make appropriate adjustments so that a correct computation can be carried out based on local conditions.

Figure 7:
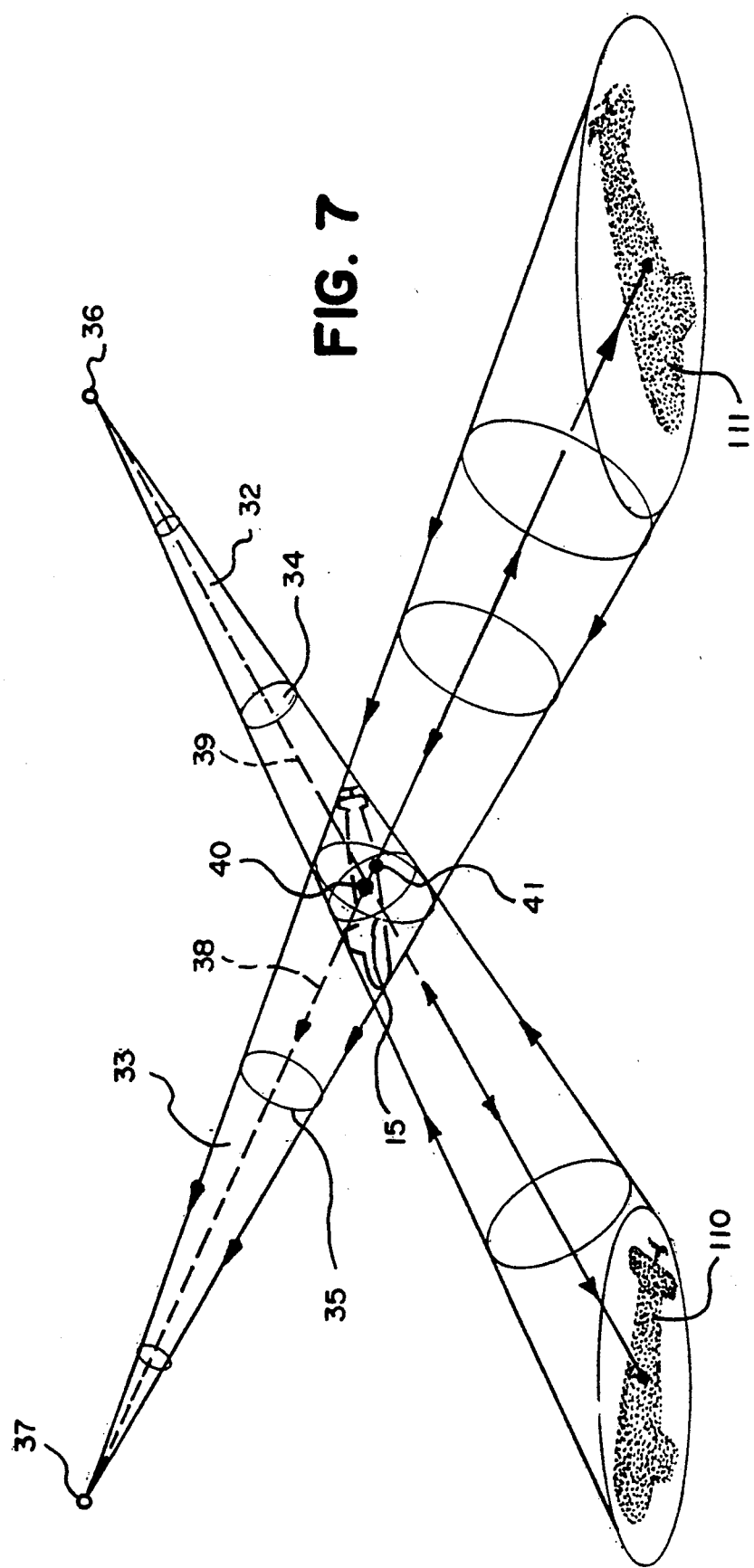
FIG. 7 illustrates geometrical relations formed by the intersection of two cones.

The effect of a submerged target blocking the sonic wave front scattered off the ocean floor is considered in FIG. 7. From the receiving hydrophones, the sonic projection of the submerged target would outline a conical-like volume of water in which there is a significant reduction in the intensity of the scattered pulse, thus forming a sonic shadow.

In FIG. 7, the geometric intersection of two such conical-like volumes 32 and 33 is illustrated in a simplified schematic representation. These volumes will be referred to simply as "cones" in the sequel, even through their shapes will usually be irregular, not circular, and the collection of rays forming the bounding lateral surfaces will be bent by refraction effects. Each cone is formed by the subtended forward projection from the receiver hydrophones at 36 and 37 of a two dimensional acoustic shadow outline of a submerged target in that paths of the scattered sonar beams in a situation such as that illustrated in FIGS. 2 and 3.

Representative conical cross sections 34 and 35 indicate the three dimensional nature of the cones which project down about the target to form its outlines perceived at the receivers as sonic silhouette regions 110 and 111 on the ocean floor from which the blocked rays were scattered by the target. The conical regions intersect at the location of the target object 15. Two such cones are treated in this description, since at least two different sonic viewed of the target are required to estimate its position, distance from the receivers, and its size.

Figure 8:
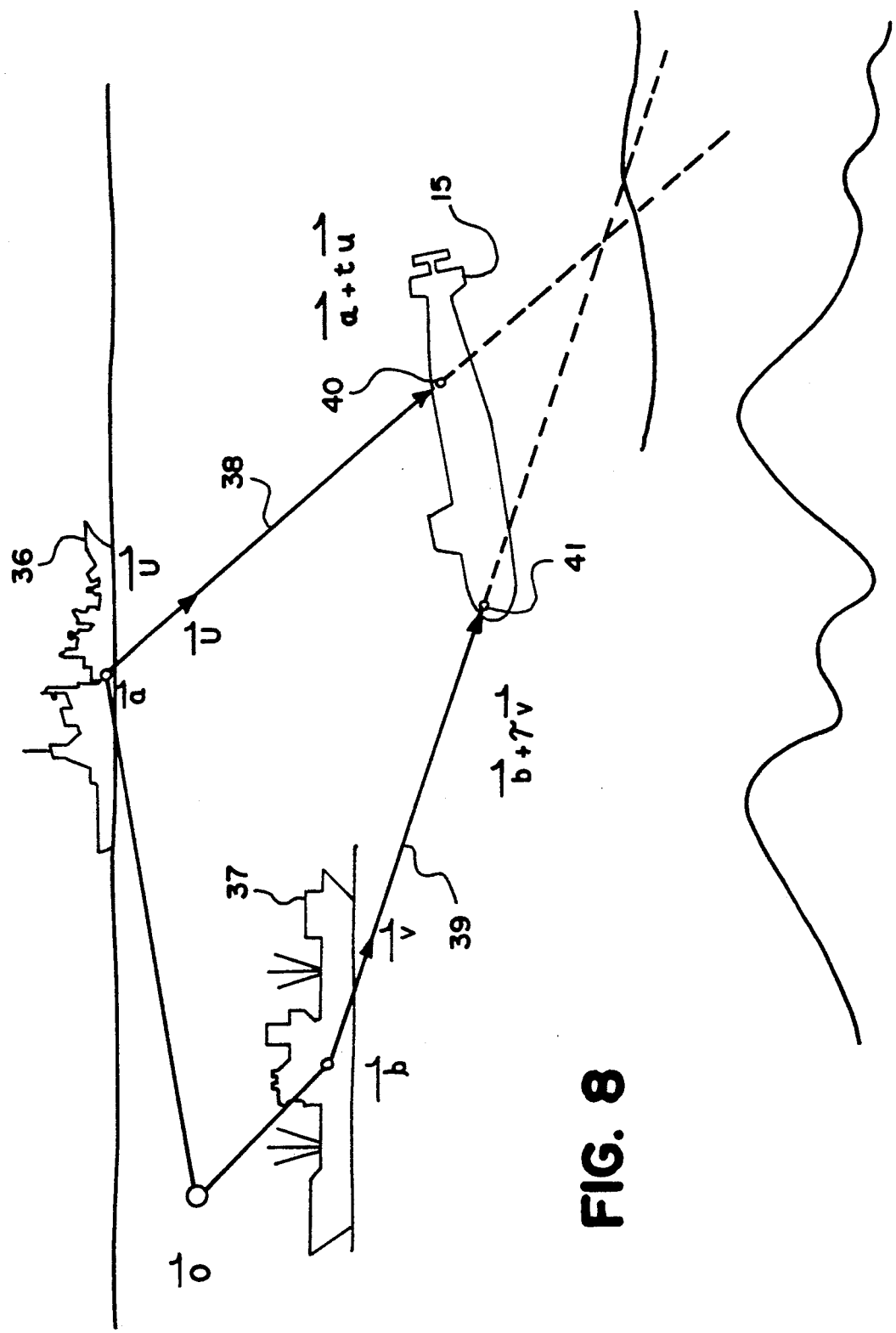
FIG. 8 is a vector representation of the geometry for the computations.

The location of the target object is determined by finding the minimal distance between the "axis rays" 38 and 39 of the cones. This minimal distance is measured here between the points 40 and 41 on the axis rays 38 and 39, respectively. Each of the "axis rays" 38 and 39 is defined as a line which coincides with a line from the center of the hydrophone array of a receiving platform through the centroid of the target silhouette, the centroid being determined from the outline of the target silhouette at the receiver. In the ideal situation, these lines would all intersect at a point on the target, i.e. points 40 and 41 would coincide. Realistically, because of the refraction of sound in water, the differing orientations of the receiver platforms, and the other environmental disturbances in the ocean, the sound rays will not follow straight lines. Measurement errors both systemic and random will also be present further complicating the analysis. Thus, it is unlikely that the axis lines would intersect and instead it is the points of closest approach 40 and 41 on each axis ray which must be determined. For rays that are straight lines these points would be the unique location of the common perpendicular to these rays. In this simplified case, a vector notation formulation is used for computing the position of the target with respect to an arbitrary coordinate reference frame and two receivers. FIG. 8 presents a simplified schematic of these vector relations. The point $\bar{o}$ is the vector origin of some conveniently chosen coordinate system; $\bar{a}$ and $\bar{b}$ are position vectors of the two receiver platforms 36 and 37; $\bar{u}$ and $\bar{v}$ are unit direction vectors directed from the receiver platform position vectors $\bar{a}$ and $\bar{b}$ towards the target 15 along the "axis rays" 38 and 39; t and $\tau$ are the scalar distance or magnification parameters, equal to the distance of the target 15 from the receiver platforms 36 and 37 to the points of closest approach 40 and 41, respectively; and $\bar{a}+t\bar{u}$ and $\bar{b}+\tau\bar{v}$ are the vector sums of these position vectors equal to position vectors from the origin $\bar{o}$ to the points of closest approach 40 and 41, respectively.

The parameters t and $\tau$ are determined by standard vector methods to be:

$$t = \frac{\begin{vmatrix} (\bar{b}\cdot\bar{u} - \bar{a}\cdot\bar{u}) & \bar{u}\cdot\bar{v} \\ (\bar{b}\cdot\bar{v} - \bar{a}\cdot\bar{v}) & \bar{v}\cdot\bar{v} \end{vmatrix}}{||u \times v||^2}$$

$$\tau = \frac{\begin{vmatrix} \bar{u}\cdot\bar{u} & (\bar{a}\cdot\bar{u} - \bar{b}\cdot\bar{u}) \\ \bar{u}\cdot\bar{v} & (\bar{a}\cdot\bar{v} - \bar{b}\cdot\bar{v}) \end{vmatrix}}{||\bar{u}\times\bar{v}||^2}$$

where the "." and "X" operations indicate the scaler product and vector cross product of two vectors respectively, $$\begin{vmatrix} A & B \\ C & D \end{vmatrix}$$

is a determinant equal to $AD-BC$ and $|\bar{u}\times\bar{v}|^2$ is the square of the magnitude of the vector cross product $\bar{u}\times\bar{v}$. With these values of t and $\tau$ the points of closest approach 40 and 41 are fixed numerically. With the points 40 and 41 known, the position of the target 15 is now estimated as well as its distance from each of the receiver platforms 36 and 37. If more than two position vectors are involved, the location can be estimated by averaging over the set of pairwise estimates. Knowledge of these distance estimates can now be employed to estimate the size of the target from the sensed dimensions of the acoustic shadows at each of the receiver platforms. Several such estimates from different positions of the receiver platforms are collected over several acoustic pulses. These 2-dimensional shape estimates of the target are combined, using tomographic silhouette reconstruction techniques or similar methods, to determine a 3-dimensional estimate of the shape of the target leading to a conjecture of the target's identity.

If the target is in motion, the sensed variation of its position over several pings can be employed to determine its velocity. This in turn will allow the surveillance system to track the target.

In reality, the velocity of sound is not constant in the ocean, but is instead dependent on various local conditions including depth, water temperature and composition, therefore, in the description above, the rays will not be straight lines in general. Empirical data such as local sound velocity tables will have to be employed in approximation and iteration algorithms which will take into account local conditions in order to obtain accurate quantitative estimates of the true sonic ray paths.

Figure 9:
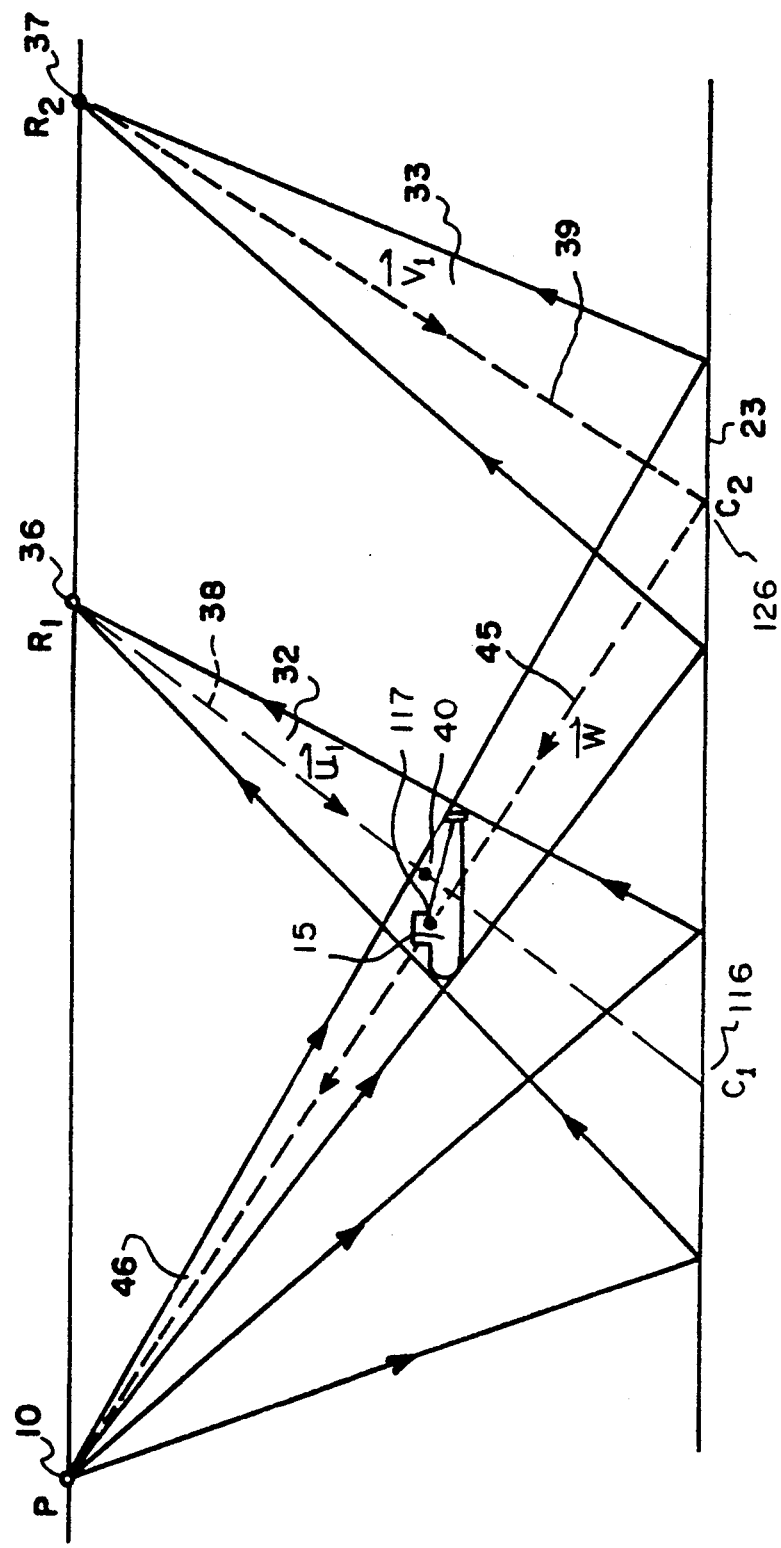
FIG. 9 is a diagram of the main elements of a variant of the surveillance configuration.

In FIG. 9, a more complex variation is presented. This variation is a mixture of the examples presented in FIGS. 2 and 4. Here the target 15 lies in both the downward directed ray cone 46 from the projector 10 with respect to the receiver 37 as in FIG. 4 and in the upward scattered ray cone 32 with respect to the receiver 36 as in FIG. 2. To estimate the location of the target 15, the centroid $C_2$ 126, of the projected shadow region 23 of the downward directed ray cone 46 is determined. This shadow region 23 is produced by the target 15 obstructing the ray cone 46 from the projector platform 10. The centroid $C_2$ 126 determines a vector $\bar{v}_1$ coinciding with the axis ray 39 from the receiver $R_2$, 37, in the upward reflected cone continuation 33 of the downward directed cone 46. A second vector $\bar{w}$ is now determined coinciding with axis ray 45 between the centroid $C_2$ 126 projected onto the ocean floor from the receiver platform $R_2$, 37, and the projector platform 10. Following the computation as in the case illustrated in FIG. 8, the vector $\bar{u}_1$ coinciding with the axis ray 38 between the receiver $R_1$, 36, and the centroid $C_1$, 116, of the target silhouette as seen from the receiver 36, and the vector $\bar{w}$ determine the points of closest approach 40 and 117, respectively. Given the location of the target 15 and the size of its silhouette 23 on the ocean floor with respect to the receiver platform 37, the dimensions of the target with respect to the receiving platform 37 can be estimated. With respect to the receiver platform 36, the target estimates are computed as in the case illustrated in FIG. 8 after the target location is determined. These estimates are then combined, as in the previous example to determine location, dimensions, and identity. Other similar variations may also occur.

Figure 10:
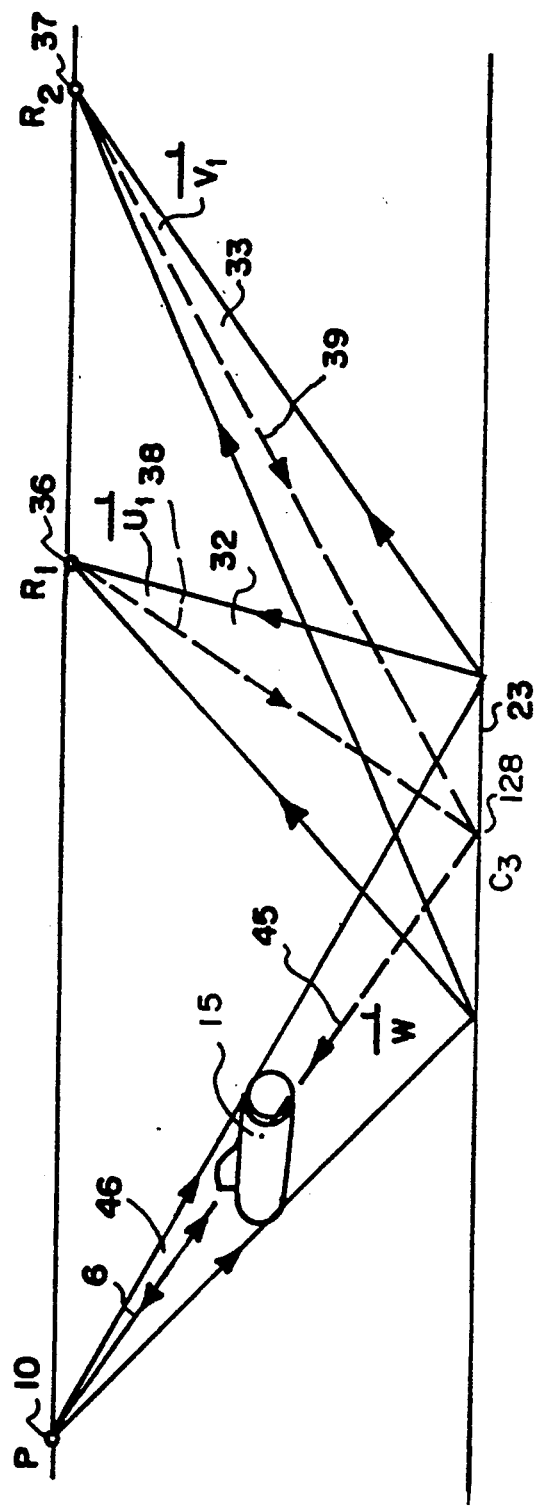
FIG. 10 is a possible alternate configuration which falls outside the preferred analytical procedure.

In FIG. 10 a configuration is depicted which cannot be resolved by the given algorithms. Here the ray cone 46 from the transmitter ship 10 is blocked by the target 15 and casts an acoustic shadow 23. The ray cones 32 and 33 from both receiver ships, $R_1$, 36 and $R_2$, 37, respectively, subtend the same shadow 23 and both vectors $u_1$, 38, and $\bar{v}_1$, 39, from the receivers 36 and 37, respectively intersect approximately at the centroid $C_3$, 128 of the shadow 23. Therefore, the vectors from this centroid toward the transmitter associated with each receiver coincide approximately in the vector $\bar{w}$, 45, and no positional determination of the target 15 results. Instead, the round trip of the transmitted sonar pulse and its reflected echo 6 can be timed by the transmitter, and knowing the angle of reception, the target's position can be determined. However, this is a situation that should be avoided because it reveals the location of the transmitter to the target 15. A non-reflecting hull design of the target 15 may also thwart this target location scheme. Repositioning the transmitter and receivers into the configurations of FIG. 8 or FIG. 9 is probably a more desirable solution to this problem.

To simplify the description which follows, the system will be explained in terms of ship platforms. However, it will be obvious that platforms other than ships can be substituted in the discussion where appropriate.

In its usual operating mode the system will designate one of the platform ships as the master ship and the other ships as the followers. The master ship and its followers will be in constant communication with each other with respect to their positions, status, and the results of their underwater surveillance. The master ship using this information will make all the decisions with respect to deployment of these ships, the timing of the pings, and the shape of the transmitted beams.

Figure 11:
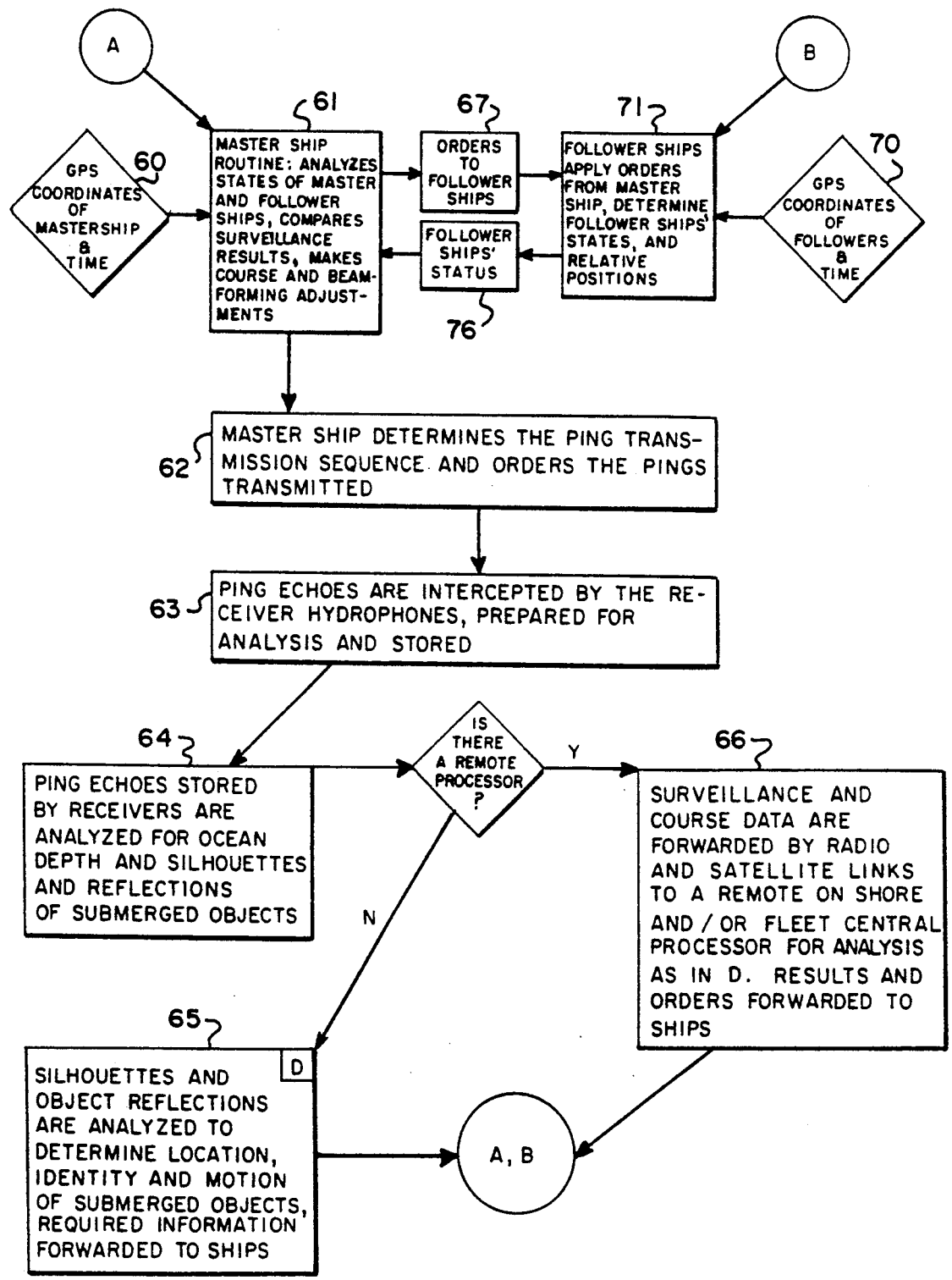
FIG. 11 is a transmission and control procedure flow chart including input requirements and acoustic signal output areas.

In FIG. 11, the main features of the flow of information and sonar signal analysis are charted. Inputs to the master supervisory routine 61 include GPS position coordinate, time, water temperature, ship velocity, 60, previous depth data 64, and information concerning submerged targets 65. Time and GPS position data is input 70 to the follower ship's routines 71. This data is used to determine the relative GPS coordinates as well as the follower ships' status 71. This information is also transmitted 76 to the master ship's supervisory routine 61. If there is a remote processor 66, information and orders from it may also be input to the master ship routine 61.

With these inputs the master ship routine 61, compares surveillance results, makes course and beamforming adjustments for itself, transmits adjustment orders to the follower ships 67, and determines and orders the ping transmission sequence 62. The resulting scattered ping echoes are intercepted by the receiver hydrophones and are prepared and stored for analysis 63. The stored ping data is now analyzed for ocean floor depths and for silhouettes and reflections of submerged objects 64. The silhouette and object reflection echo data may be analyzed on the ships 65 or forwarded by radio for analysis to remote processors 66 to determine the location, identity, and track of the underwater objects, the results becoming inputs to the ships' routines 61 and 71.

Figure 12:
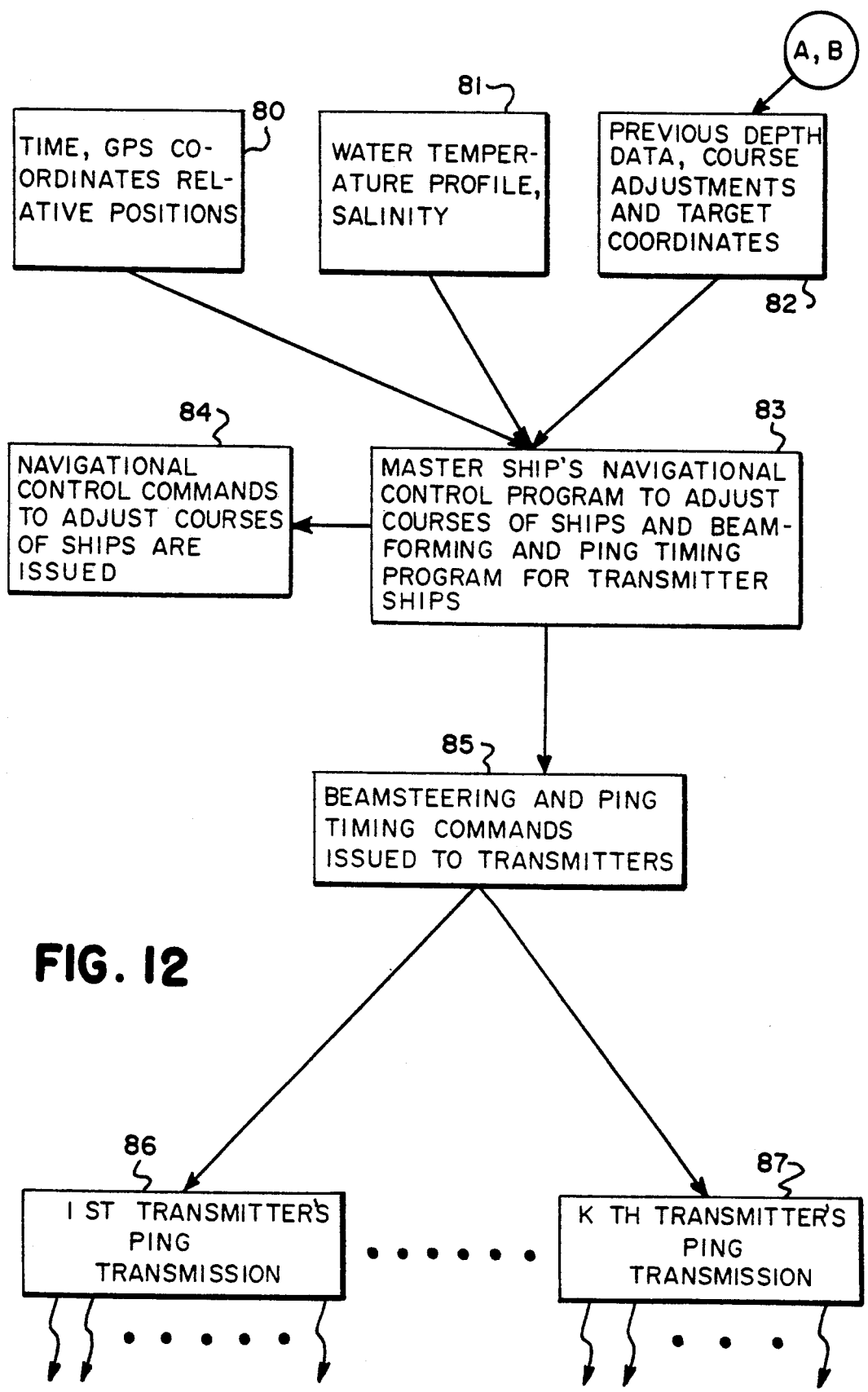
FIG. 12 is a transmission procedure flow chart.

FIG. 12 outlines the ping transmission routines and the navigational control of the ships. The time, the GPS coordinates of the ships, and their relative positions is input 80 to the master ship's navigational and beamforming control program 83. This information is accompanied by the input of the water temperature profile and salinity 81 along with the previous depth data, submerged target coordinates, and previous course adjustments 82. The master ship control program incorporates this data into preparing velocity and course correction orders which are issued to all ships 84. This input data is also employed by the master ship to issue beam steering and ping timing commands to the transmitter ships 85, which are then issued to the 1st through the kth transmitters 86 and 87 as required. Here a remote facility could be used in place of the master ship.

Figure 13:
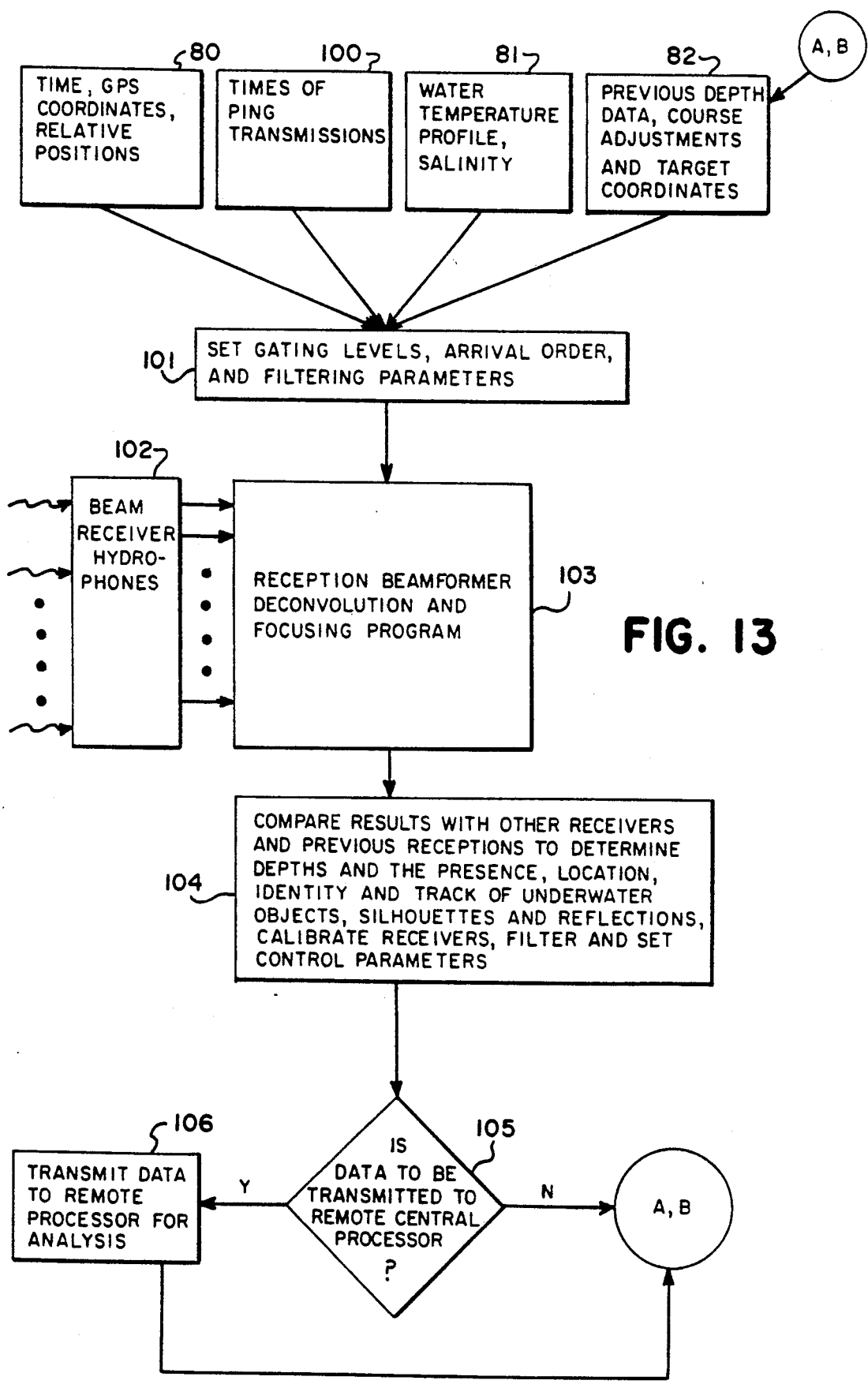
FIG. 13 is a reception procedure flow chart.

In FIG. 13, the scheme for the reception and analysis of the ping echoes is outlines. As in FIG. 12, the inputs consist of the time, GPS coordinates and relative position 80, the water temperature and salinity 81, the target coordinates and depth data 82 along with the time of the latest ping transmissions 100. The inputs are used to set the gating levels of the receiver hydrophones, the arrival order of the ping echoes, and the filtering parameters 101. This information is now used to set parameters for the receiver beamforming, deconvolution and focusing programs 103 which receive the electrical impulse inputs from the arrays of receiver hydrophones 102 and process these signals. These processed signal data results are then analyzed to determine ocean depth background and the presence, location identity, and track of underwater objects through their silhouettes and reflections 104. This data is also used to calibrate and adjust receivers, filters, and set control parameters 104.

If there is a remote central processor, this data is transmitted to the remote processor 105 where it is analyzed 106 and transmitted back to the ship's supervisory routine 82. If there is no remote processor, it is transmitted directly 105 to the ship'supervisory routine 82. It should be noted that several acoustic frequencies might be used to avoid confusion.

Figure 14:
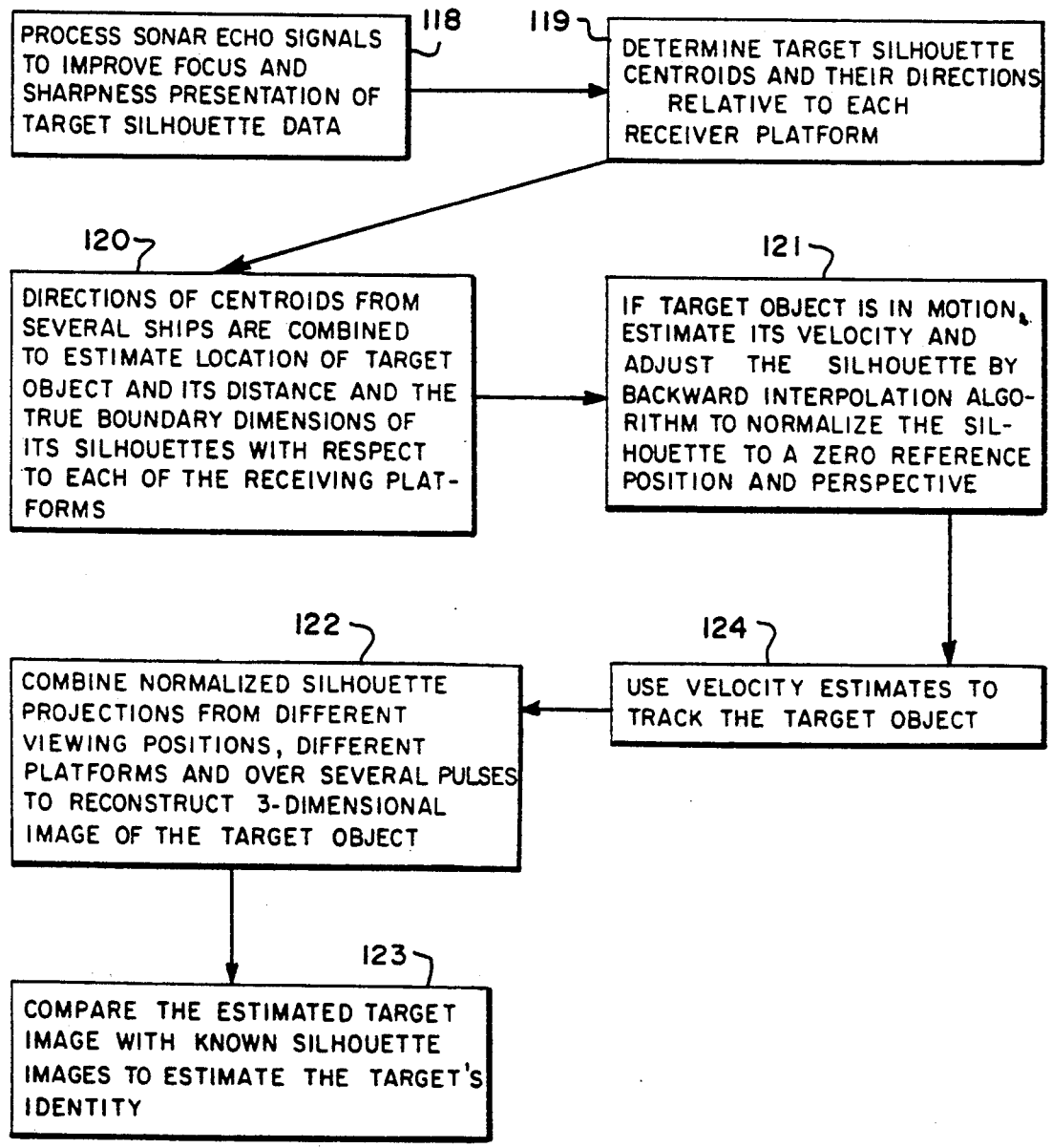
FIG. 14 is a silhouette analysis procedure flow chart.

FIG. 14 outlines the procedure for analyzing the received silhouette data. In 118 the sonar echoes are filtered to improve the focus and sharpness of the silhouette image data. The dimensions of these filtered silhouette images are analyzed in 119 to estimate their centroids and the direction of the centroid as viewed from each receiver platform. These centroid directions are now combined in 120 to determine the true location of the target object. Given the true location of the target object, each receiver platform is now able to estimate its distance from the target object. This distance in turn can be used by each receiver platform to estimate the true dimensions of the silhouette in its projected orientation with respect to this receiver platform. If the target object is in motion, its velocity is estimated in 121 and the silhouette dimensions are normalized by a backward interpolation algorithm to normalize the silhouette to a predetermined zero reference position and perspective. These normalized silhouette projections from different viewing positions over several pulses are combined in 122 to reconstruct a three-dimensional image of the target object. This three-dimensional image is now compared in 123 with silhouette images of known objects to determine the target's identity. The velocity estimates of 121 are also applied in 124 to track the target object.

It will be understood that the above-description of the invention is susceptible to various modifications, changes, and adaptations, and the same are intended to be comprehended within the meaning and range of equivalents of the appended claims.

What is claimed is:

1. A system for underwater surveillance of the ocean through the transmission and reception of underwater sonic pulses, said system comprising at least two platforms positions or travelling some distance apart from each other, wherein at least one of said platforms is equipped with means for transmitting underwater sonic pulses and scattering them off the ocean floor in directions such that portions of the scattered pulses are intercepted by at least one of said transmitting platform's companion platforms in the absence of submerged sonic obstructing objects, means on at least one of said platforms for receiving said sonic pulses and determining the angles of arrival of said intercepted pulses, means on each of said reception platforms for determining the times of transmission and the times of reception of said conic pulses, means on each of said reception platforms for sensing acoustic shadows cast by submerged sonic obstructing objects, position fixing means on each moveable platform for determining its global location; said system having a relative position fixing means for determining the positions of said platforms with respect to each other, communication means on each platform for transmitting and receiving data from its companion platforms; said system having means for recording, processing, and analyzing portions of said intercepted pulses to estimate the depth of the ocean floor at the locations of the pulse reflections, and means for estimating the directions, distances, boundaries, and dimensions of the sonic obstructing objects casting said acoustic shadows, and said system having means for recording selected portions of said analyzed data.

2. The system of claim 1, wherein said platforms are ships.

3. The system of claim 1, wherein at least one of said platforms has a means for determining and directing the course, velocity, and sonic pulsing of each of its moveable companion platforms.

4. The system of claim 1, wherein said means for transmitting said sonic pulses are sonar projector arrays.

5. The system of claim 1, wherein said means for receiving said sonic pulses are sonar hydrophone arrays.

6. The system of claim 1, wherein said position fixing means on each of said platforms for determining its absolute location, and said relative position fixing means of said system for determining the relative positions of said platforms with respect to each other, are the apparatus and receivers associated with a space satellite positioning system.

7. The system of claim 6, wherein said space satellite positioning system is the NAVSTAR GLOBAL POSITIONING SYSTEM.

8. The system of claim 1, further comprising a remote data processing facility for processing the obtained data and directing the surveillance operation; said system further comprising means for rapid remote communication and data transfer between system elements.

9. A method for underwater surveillance of the ocean through the transmission and reception of underwater sonic pulses, comprising the steps of providing a system of sonar transmitting and receiving platforms having at least one platform equipped with means for transmitting underwater sonic pulses in a direction such that portions of said pulses are scattered off the ocean floor to at least one companion receiver platform located or travelling some distance from said transmitter platforms; said receiver platforms being kept sufficiently close to said transmitter platforms to be able to intercept portions of said scattered pulses; said receiver platforms being equipped with sonic receiver equipment, having said receiver platforms intercept portions of said scattered sonic pulses not obstructed by submerged sonic obstructing objects; said receiver platforms being provided with means for processing and analyzing said received pulses, providing each of said platforms with a data transmission and reception communication system, providing position fixing data to said platforms enabling each of said platforms to determine its global location and its relative position with respect to its companion platforms, providing each of said platforms with the times of transmission of said pulses, having each of said platforms determine the times it intercepts portions of said pulses, having each of said platforms determine the angles of arrival of portions of said intercepted scattered sonic pulses, having said system record said angles of arrival, position and time data of said received portions of said pulses, having the system process and analyze said intercepted pulses to estimate the depths of the ocean at the locations of the pulse reflections, having said system analyze said intercepted pulses to estimate the directions, locations, boundaries and dimensions of the acoustic shadows cast by submerged sonic obstructing objects which may be encountered by said scattered sonic pulses and having said system record selected portions of this analyzed data.

10. The method of claim 9, further comprising the step of designating one of the platforms as the controlling or master platform, this platform to determine the courses and velocities of its companion platforms and also to determine the timing of the transmission of said sonic pulses, their directions and their shapes.

11. The method of claim 9, further comprising the steps of estimating the locations, boundaries, and dimensions of said sonic obstructing objects by estimating the position of closest mutual approach of rays geometrically projected from at least two receiver reference positions through the centroids of said acoustic shadows in the direction of said shadows, said location of closest mutual approach of said rays being used to estimate the true scale of the distance, location, and dimensions of said boundaries of said sonic obstructions.

12. The method of claim 11, further comprising the steps of estimating the identity of said sonic obstructing object by synthesizing a three-dimensional image of said object using silhouette reconstruction techniques and comparing said image with the images of known objects.

13. The method of claim 11, further comprising the step of tracking said sonic obstructions by computing changes in position of said locations of closest approach over several of said sonic pulses.

14. The method of claim 9, wherein each set of sonic pulses from a particular transmitting platform is transmitted at a different frequency from the set of sonic pulses transmitted from each of the other of said transmitting platforms.

15. The method of claim 9, wherein the position fixing data is provided by a spaced satellite positioning system.

16. The method of claim 15, wherein said space satellite positioning system is the NAVSTAR GLOBAL POSITIONING SYSTEM.

17. The method of claim 9, further comprising the steps of providing a remote data processing facility for processing the obtained data and directing said surveillance operation, providing rapid remote communication and data transfer means between system elements, transferring said data from said platforms to said remote processing facility, processing said data at said remote facility, incorporating said data processing results in said remote facility's surveillance operation directions, and having said remote processing facility communicate said data processing results and surveillance operation directions to said platforms.

* * * * *